United States Patent
Komiyama et al.

(10) Patent No.: US 11,577,630 B2
(45) Date of Patent: Feb. 14, 2023

(54) SEAT SLIDER DEVICE

(71) Applicant: TOYOTA BODY SEIKO CO., LTD., Takahama (JP)

(72) Inventors: Masashi Komiyama, Takahama (JP); Yoshihisa Hori, Takahama (JP); Takayuki Ogasawara, Takahama (JP); Hiroaki Hyodo, Takahama (JP); Tadashi Takahashi, Takahama (JP)

(73) Assignee: TOYOTA BODY SEIKO CO., LTD., Takahama (JP)

( * ) Notice: Subject to any disclaimer, the term of this patent is extended or adjusted under 35 U.S.C. 154(b) by 357 days.

(21) Appl. No.: 16/778,449

(22) Filed: Jan. 31, 2020

(65) Prior Publication Data
US 2020/0282868 A1   Sep. 10, 2020

(30) Foreign Application Priority Data

Mar. 4, 2019   (JP) .............................. JP2019-038848

(51) Int. Cl.
*B60N 2/07*   (2006.01)
*B60N 2/02*   (2006.01)

(52) U.S. Cl.
CPC ............. *B60N 2/07* (2013.01); *B60N 2/0232* (2013.01)

(58) Field of Classification Search
CPC ...... B60N 2/07; B60N 2/0232; B60N 2/0702; B60N 2/0722
See application file for complete search history.

(56) References Cited

U.S. PATENT DOCUMENTS

| | | | | |
|---|---|---|---|---|
| 9,919,624 | B2* | 3/2018 | Cziomer | B60N 2/0875 |
| 10,994,637 | B2* | 5/2021 | Ogasawara | B60N 2/0705 |
| 2004/0155168 | A1 | 8/2004 | Matsushiro | |
| 2014/0110554 | A1* | 4/2014 | Oya | B60N 2/0722 |
| | | | | 248/430 |
| 2017/0166091 | A1 | 6/2017 | Cziomer et al. | |
| 2017/0368963 | A1* | 12/2017 | Watanabe | B60N 2/0722 |
| 2019/0337418 | A1* | 11/2019 | Condamin | B60N 2/0722 |
| 2020/0254907 | A1* | 8/2020 | Nakano | B60N 2/43 |

FOREIGN PATENT DOCUMENTS

| | | |
|---|---|---|
| JP | H10-159845 A | 6/1998 |
| JP | H11-72118 A | 3/1999 |
| JP | 2004-210113 A | 7/2004 |
| JP | 2017-030527 A | 2/2017 |
| JP | 2018-020665 A | 2/2018 |
| JP | 2018-086885 A | 6/2018 |

OTHER PUBLICATIONS

Sep. 6, 2022 Office Action issued in Japanese Patent Application No. 2019-038848.
Nov. 29, 2022 Office Action issued in Japanese Patent Application No. 2019-038848.

* cited by examiner

*Primary Examiner* — Mark R Wendell
(74) *Attorney, Agent, or Firm* — Oliff PLC (57) ABSTRACT

A seat slider device may include: a lower rail attachable to a body of a vehicle; an upper rail attachable to a seat and slidably engaging with the lower rail; at least one roller provided in the upper rail and pressed against the lower rail or the body of the vehicle; and an actuator configured to rotate the at least one roller.

3 Claims, 6 Drawing Sheets

SEAT SLIDER DEVICE

CROSS-REFERENCE TO RELATED APPLICATION

This application claims priority to Japanese Patent Application No. 2019-38848 filed on Mar. 4, 2019, the contents of which are hereby incorporated by reference into the present application.

TECHNICAL FIELD

The teaching disclosed herein relates to a seat slider device which slides a seat of a vehicle by an actuator.

BACKGROUND

A seat slider device that moves (slides) a seat by an actuator is known. The seat slider device is provided with a long-lengthened lower rail attached to a body of a vehicle and an upper rail engaged with the lower rail. The seat is attached to the upper rail. A seat slider device described in Japanese Patent Application Publication No. 2004-210113 places a lead screw inside a lower rail. Further, an upper rail is provided with a screw nut into which the lead screw is screwed, and an actuator and a worm gear for rotating the screw nut. When the screw nut is rotated by the actuator and the worm gear, the upper rail (that is, a seat) moves together with the screw nut.

A seat slider device described in Japanese Patent Application Publication No. 2018-020665 is provided with ball bearings contacting a floor of a vehicle body and a plurality of actuators for rotating the ball bearings in two orthogonal directions. Since the ball bearings are rotated in the two directions, the seat slider device is enabled to freely move two-dimensionally on a surface of the floor of the vehicle body.

SUMMARY

The seat slider devices described in Japanese Patent Application Publication No. 2004-210113 and Japanese Patent Application Publication No. 2018-020665 both have moving mechanisms with complicated structures, by which cost is increased. The disclosure herein provides a seat slider device capable of moving an upper rail by an actuator with a simple structure.

A seat slider device disclosed herein may comprise: a lower rail attachable to a body of a vehicle; an upper rail attachable to a seat and movably (slidably) engaging with the lower rail; at least one roller provided in the upper rail and pressed against the lower rail or the body of the vehicle; and an actuator configured to rotate the at least one roller. This seat slider device has a simple structure, since the at least one roller and the actuator are simply added to a conventional seat slider device that does not have an actuation mechanism.

In one aspect, the seat slider device disclosed herein may comprise the following configuration. The lower rail may be placed in a groove provided in a floor of the body of the vehicle. The at least one roller may be pressed against an upper surface of a cover which covers a gap between an inner side surface of the groove and the lower rail. The cover may be constituted of metal or preferably resin. Since a resin cover has a high friction coefficient, the at least one roller, which is driven by the actuator, is less likely to slip by being pressed against an upper surface of the resin cover having the high friction coefficient. The resin cover may have a lib extending downward from lower surface of the resin cover. The lib is configured to enter a gap between an inner side surface of the groove and the lower rail.

In another aspect, the seat slider device disclosed herein may comprise the following configuration. The at least one roller may include a plurality of rollers, and the rollers may be provided in the upper rail. One or more of the rollers may be pressed against one side plate of the lower rail in a short direction of the lower rail from inside of the lower rail. One or more remaining rollers may be pressed against another side plate of the lower rail in the short direction from inside of the lower rail. The actuator may be configured to rotate at least one of the rollers. In the seat slider device of such aspect, the at least one of the rollers, which is driven, is placed inside the lower rail, thus a size of the seat slider device as a whole can be maintained as same as those of conventional seat slider devices. In addition, the rollers are pressed to their corresponding side plates from a center side of the lower rail in the short direction, thus friction between the rollers and the side plates can be increased. Therefore, the rollers are less likely to slip.

In still another aspect, the seat slider device disclosed herein may comprise the following configuration. The lower rail may comprise: a bottom plate; a pair of side plates, the side plates extending upward respectively from both ends of the bottom plate in a short direction of the lower rail; a pair of upper plates, the upper plates extending respectively from upper ends of the side plates toward a center of the lower rail in the short direction; and a pair of inner plates, the inner plates extending downward respectively from center-side ends of the upper plates (from ends thereof on center side of the lower rail in the short direction). The at least one roller may include a pair of rollers, the pair of rollers being provided in the upper rail, each of the pair of rollers being in contact with corresponding one of corners between the upper plates and the inner plates in the short direction, and a diameter of each of the pair of rollers may gradually increase toward the center of the lower rail (toward the center of the lower rail in the short direction). In the seat slider device of this aspect, the pair of rollers, each have the increasing diameter, is firmly held between the pair of corners by rigidity of the lower rail in the short direction. As a result, friction between the rollers and the corners is increased, thus the rollers are less likely to slip.

Details and further improvements of the art disclosed herein will be described in the following DETAILED DESCRIPTION.

DETAILED DESCRIPTION

First Embodiment

Figure 1:
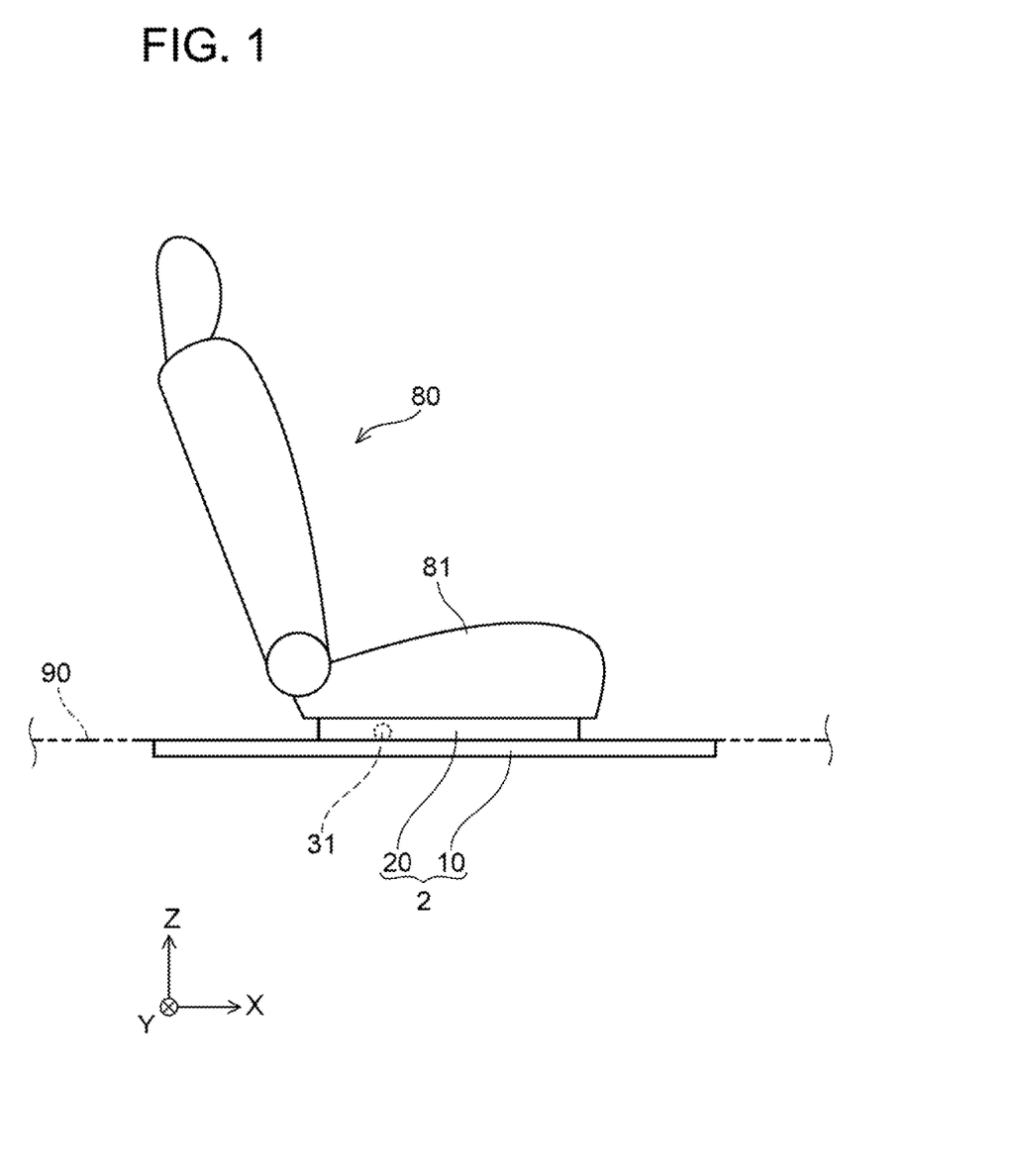
FIG. 1 is a side view of a seat slider device of a first embodiment.

A seat slider device 2 of a first embodiment will be described with reference to the drawings. FIG. 1 shows a side view of the seat slider device 2 attached to a vehicle. The seat slider device 2 is constituted of a lower rail 10 and an upper rail 20. The lower rail 10 has a long length. The upper rail 20 is attached to the lower rail 10 so as to be movable (slidable) in a longitudinal direction thereof. The lower rail 10 is fixed to a floor panel 90 of a vehicle body. The upper rail 20 is attached to a lower portion of a seat cushion 81 of a seat 80. The upper rail 20 is attached to the lower portion of the seat cushion 81 via a frame that is not shown. The seat slider device 2 is attached to each of left and right sides of the lower portion of the seat cushion 81. An X direction in a coordinate system in the drawings corresponds to a rail longitudinal direction of the lower rail 10 and the upper rail 20. A Y direction corresponds to a rail short direction. A +Z direction in the coordinate system of the drawings indicates an upward direction.

A drive roller 31 configured to be driven by an actuator is attached to the upper rail 20. In FIG. 1, depiction of the actuator is omitted. The drive roller 31 is in contact with the floor panel 90. The upper rail 20 can move relative to the lower rail 10 by the drive roller 31 driven by the actuator. That is, the seat slider device 2 can move (slide) the seat by electric actuation.

Figure 2:
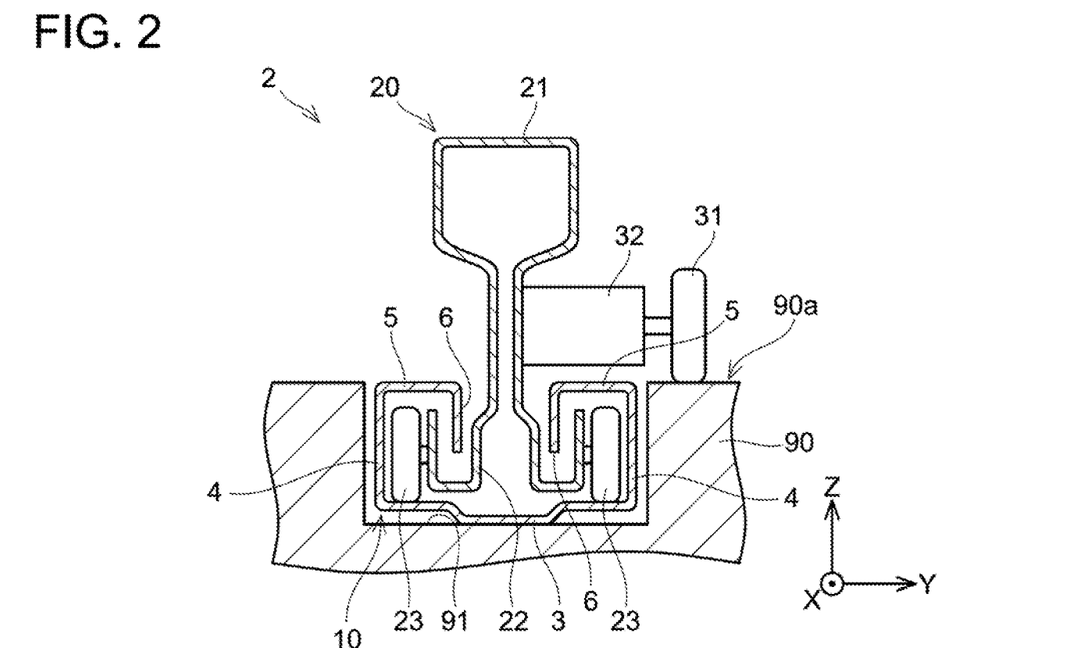
FIG. 2 is a cross-sectional view of the seat slider device sectioned along a plane orthogonally intersecting a rail longitudinal direction.

FIG. 2 shows a cross-sectional view of the seat slider device 2. The cross section of FIG. 2 shows a cross section of the lower rail 10 and the upper rail 20 sectioned along a plane that orthogonally intersects the rail longitudinal direction (X direction). The cross-sectional view of FIG. 2 sections the upper rail 20 at a position located frontward relative to an actuator 32 to be described later. The upper rail 20 is provided with a lock mechanism configured to fix the upper rail 20 to the lower rail 10, however, depiction of the lock mechanism is omitted. The lock mechanism is the same as those provided in conventional seat slider devices, thus description thereof will be omitted as well.

Firstly, a shape of the lower rail 10 will be described with reference to FIG. 2. The lower rail 10 is accommodated in a rail groove 91 provided in the floor panel 90. The lower rail 10 includes a bottom plate 3 attached to the vehicle body, a pair of outer plates 4, a pair of upper plates 5, and a pair of inner plates 6. The pair of outer plates 4 extends upward respectively from both ends of the bottom plate 3 in the rail short direction (Y direction in the drawings). The pair of upper plates 5 respectively extends laterally from upper ends of the outer plates 4 toward a center of the lower rail 10 in the rail short direction. The pair of inner plates 6 extends downward respectively from inner ends of the upper plates 5. The pair of inner plates 6 faces each other. The lower rail 10 opens upward between the pair of inner plates 6. The lower rail 10 has its upper surface opened in an elongated shape along the rail longitudinal direction.

The upper rail 20 will be described. A body lower portion 22 of the upper rail 20 is located inside the lower rail 10 and supports driven rollers 23. The driven rollers 23 are in contact with the bottom plate 3 of the lower rail 10 and facilitate smooth movement of the upper rail 20. The upper rail 20 is movable (slidable) along the longitudinal direction of the lower rail 10. A body upper portion 21 of the upper rail 20 is exposed above the lower rail 10. The frame that is not shown is attached to the body upper portion 21, and the seat cushion 81 (see FIG. 1) is fixed to the frame. The body upper portion 21 and the body lower portion 22 are continuous through the opening of the lower rail 10. In other words, a part of the upper rail 20 (the body lower portion 22) is located inside the lower rail 10 and the remaining part thereof (the body upper portion 21) protrudes upward beyond the lower rail 10 through the opening of the lower rail 10.

The actuator 32 is fixed to the body upper portion 21 of the upper rail 20, and the drive roller 31 is fixed to an output shaft of the actuator 32. The actuator 32 is constituted of a motor and a gearset. A drive shaft of the motor is connected to an input shaft of the gearset, and an output shaft of the gearset (the output shaft of the actuator 32) is connected to the drive roller 31. The gearset is configured to reduce rotation of the motor and transmit it to the drive roller 31. The drive roller 31 is pressed against an upper surface 90$a$ of the floor panel 90. The drive roller 31 is rotated by the actuator 32. As described above, the upper rail 20 is able to move relative to the lower rail 10 in the longitudinal direction thereof by the actuator 32 and the drive roller 31. Rubber is applied to an outer peripheral surface of the drive roller 31 that is in contact with the floor panel 90, thus the drive roller 31 can rotate on the floor panel 90 without slipping.

As described above, the seat slider device 2 of the first embodiment has a simple structure in which only the actuator 32 and the drive roller 31 are added to a conventional seat slider device that is not provided with an actuator.

Second Embodiment

Figure 3:
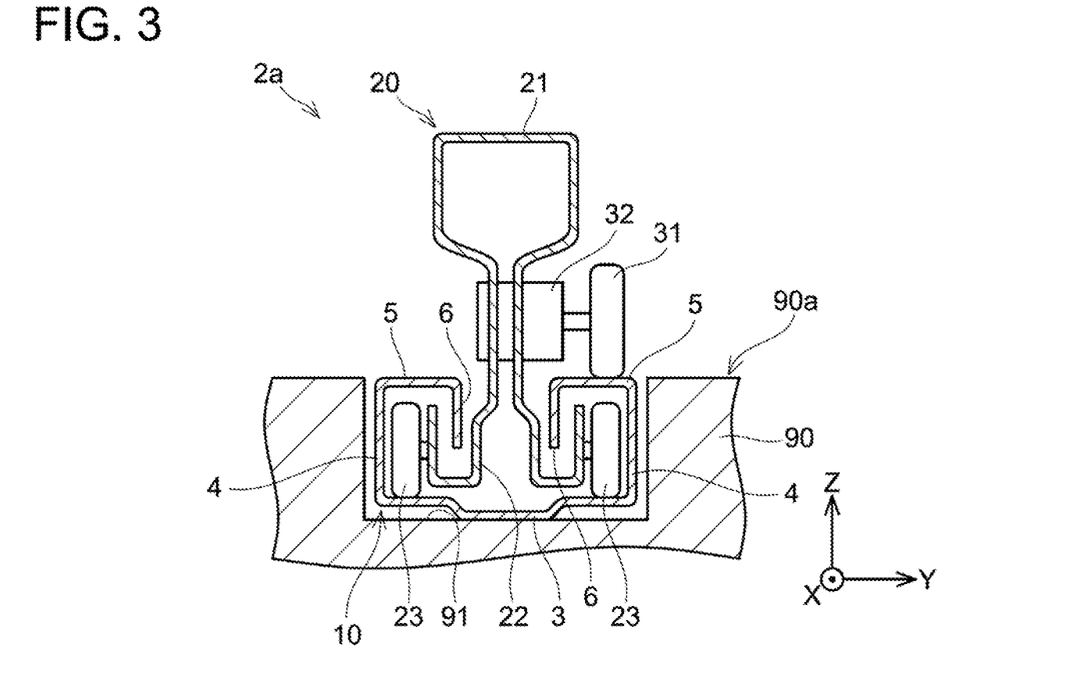
FIG. 3 is a cross-sectional view of a seat slider device of a second embodiment.

FIG. 3 shows a cross-sectional view of a seat slider device 2$a$ of a second embodiment. The cross-sectional view of FIG. 3 shows a cross section that sections the lower rail 10 and the upper rail 20 along a plane orthogonally intersecting the rail longitudinal direction (the X direction in the coordinate system of the drawings), similarly to the cross-sectional view of FIG. 2. Similarly to FIG. 2, the cross-sectional view of FIG. 3 sections the upper rail 20 at a position located frontward relative to the actuator 32.

The upper rail 20 of the seat slider device 2$a$ of the second embodiment also includes the actuator 32 and the drive roller 31, similarly to the seat slider device 2 of the first embodiment. The drive roller 31 is connected to the output shaft of the actuator 32. Unlike the seat slider device 2 of the first embodiment, the drive roller 31 is pressed against one of the upper plates 5 of the lower rail 10, instead of the upper surface 90$a$ of a floor panel 90. The actuator 32 and the drive roller 31 enable the upper rail 20 of the seat slider device 2$a$ of the second embodiment to move relative to the lower rail 10 in the longitudinal direction thereof by electric actuation.

Third Embodiment

Figure 4:
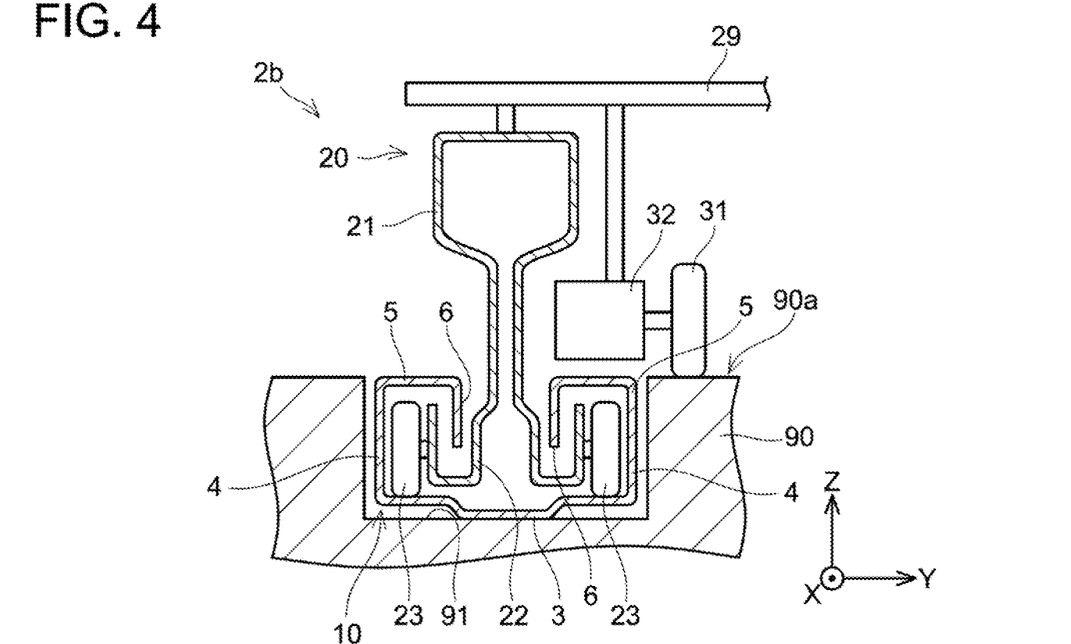
FIG. 4 is a cross-sectional view of a seat slider device of a third embodiment.

FIG. 4 shows a cross-sectional view of a seat slider device 2$b$ of a third embodiment. The cross-sectional view of FIG. 4 also shows a cross section that sections the lower rail 10 and the upper rail 20 along a plane orthogonally intersecting the rail longitudinal direction (the X direction in the coordinate system of the drawings), similarly to the cross-sectional views of FIGS. 2 and 3.

The actuator 32 and the drive roller 31 are also attached to the upper rail 20 of the seat slider device 2b of the third embodiment. However, in the third embodiment, the actuator 32 is attached to the upper rail 20 via a frame 29 fixed to the body upper portion 21 of the upper rail 20. As described above, the seat cushion 81 (see FIG. 1) is attached to the frame 29. The drive roller 31 is connected to the output shaft of the actuator 32, and the drive roller 31 is pressed against the upper surface 90a of a floor panel 90. In the seat slider device 2b of the third embodiment as well, the actuator 32 and the drive roller 31 enables the upper rail 20 to move relative to the lower rail 10 in the longitudinal direction thereof by electric actuation.

Fourth Embodiment

Figure 5:
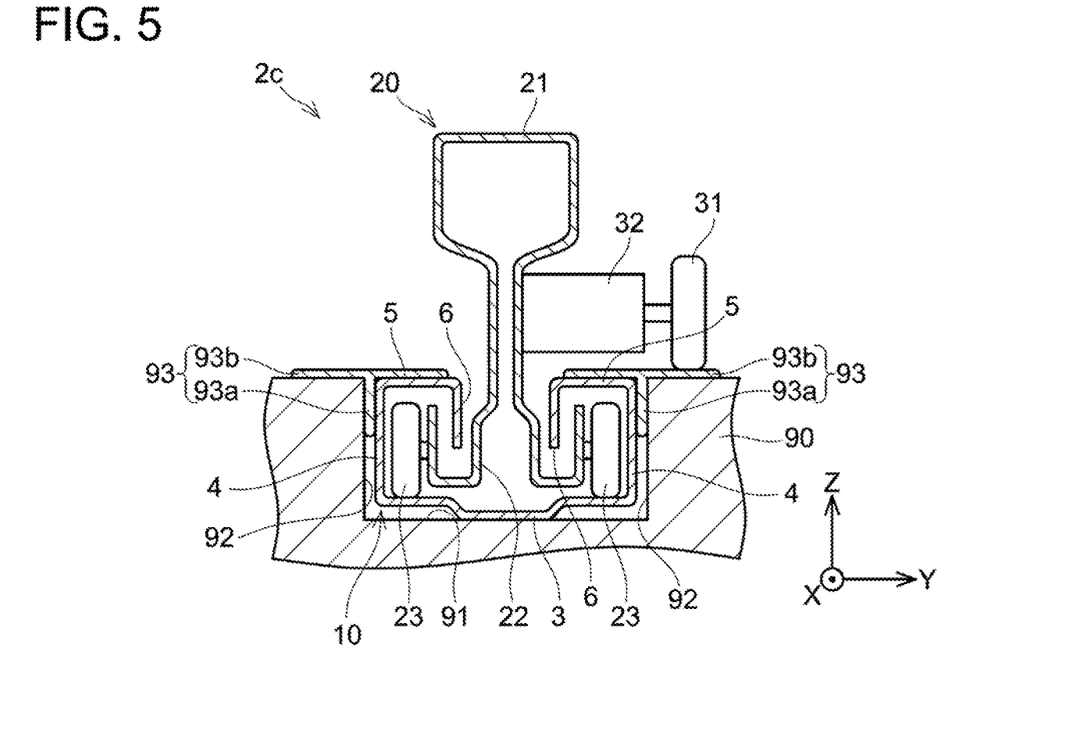
FIG. 5 is a cross-sectional view of a seat slider device of a fourth embodiment.

FIG. 5 shows a cross-sectional view of a seat slider device 2c of a fourth embodiment. The seat slider device 2c of the fourth embodiment includes a pair of T-shaped moldings 93.

The pair of T-shaped moldings 93 is provided to close gaps between the lower rail 10 and an inner side surface 92 of the rail groove 91 provided in the floor panel 90. The T-shaped moldings 93 are each provided with a flat portion 93b that covers the upper surface of the floor panel 90 and corresponding one of the upper plates 5 of the lower rail 10, and a lib 93a that extends downward from a center of a lower surface of the flat portion 93b in the rail short direction. The libs 93a are respectively inserted into the gaps between the inner side surface 92 of the rail groove 91 and the lower rail 10. In other words, the T-shaped moldings 93 enter the gaps between the inner side surface 92 of the rail groove 91 and the lower rail 10 as well as cover both sides of each gap (the floor panel 90 and the upper plates 5 of the lower rail 10). The T-shaped moldings 93 are constituted of highly flexible resin.

In the seat slider device 2c of the fourth embodiment, the drive roller 31 is pressed against an upper surface of one of the T-shaped moldings 93. As described above, the T-shaped moldings 93 are constituted of highly flexible resin, thus their surfaces have a high friction coefficient. Due to this, the drive roller 31 is less likely to slip on the T-shaped molding 93. The seat slider device 2c of the fourth embodiment has an advantage that the drive roller 31 is less likely to slip. Further, since the T-shaped moldings 93 are provided with the libs 93a inserted into the gaps between the rail groove 91 and the lower rail 10, the seat slider device 2c has another advantage that the T-shaped molding 93 is less likely to be displaced even when the drive roller 31 moves on its upper surface.

Although not as effective as the advantages achieved by employing the T-shaped moldings 93, the drive roller 31 may move on a cover that covers one of the gaps between the rail groove 91 and the lower rail 10, instead of moving on one of the T-shaped moldings 93. The cover may be constituted of resin, or it may be constituted of metal or another material.

Fifth Embodiment

Figure 6:
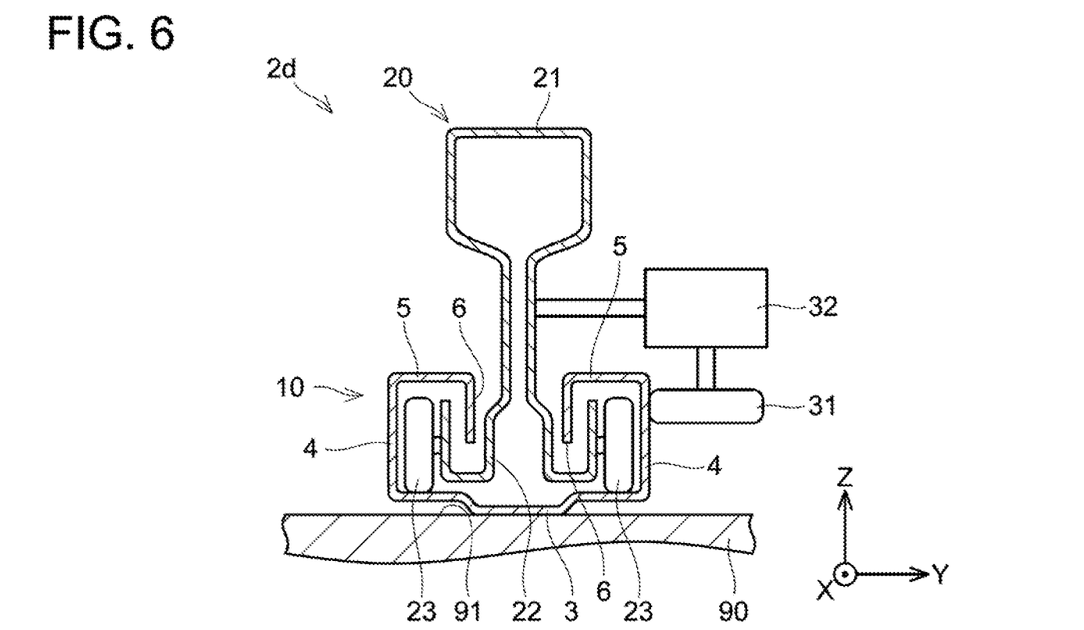
FIG. 6 is a cross-sectional view of a seat slider device of a fifth embodiment.

FIG. 6 shows a cross-sectional view of a seat slider device 2d of a fifth embodiment. In the seat slider device 2d, the lower rail 10 is fixed to the upper surface of a flat floor panel 90, and the outer plates 4 are exposed. The drive roller 31 is pressed against one of the exposed outer plates 4 of the lower rail 10 from outside.

Sixth Embodiment

Figure 7:
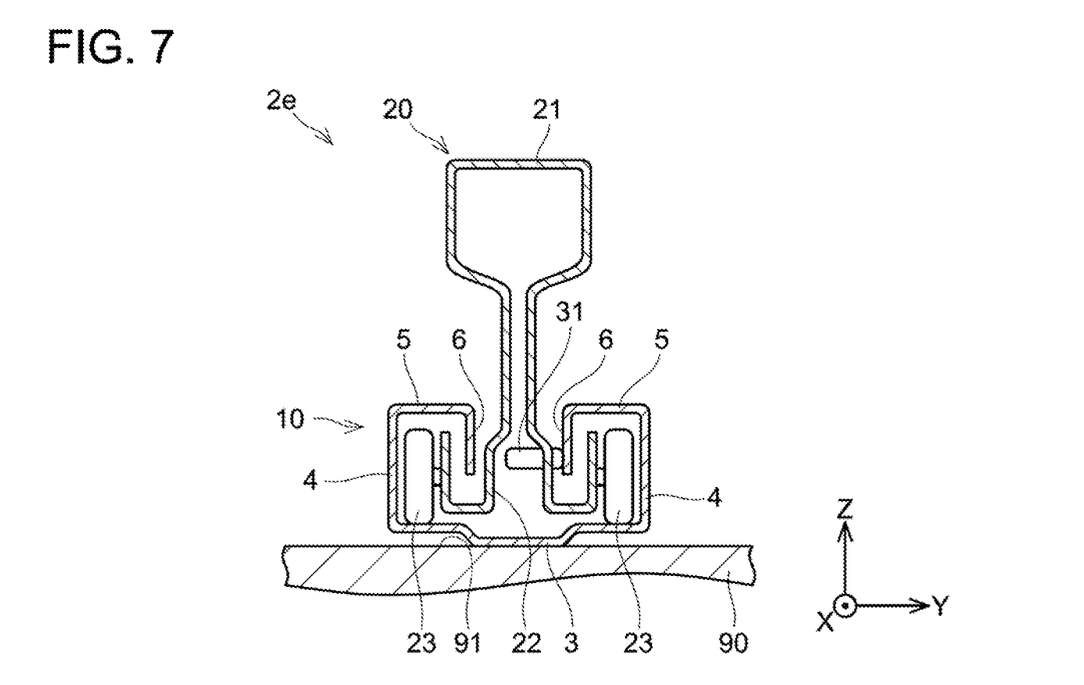
FIG. 7 is a cross-sectional view of a seat slider device of a sixth embodiment.

FIG. 7 shows a cross-sectional view of a seat slider device 2e of a sixth embodiment. In the seat slider device 2e, the drive roller 31 is pressed against one of the inner plates 6 of the lower rail 10. In FIG. 7, depiction of an actuator configured to drive the drive roller 31 is omitted. In the seat slider device 2e of the sixth embodiment, an increase in a size of the device as a whole is suppressed since the drive roller 31 is located inside the lower rail 10.

Seventh Embodiment

Figure 8:
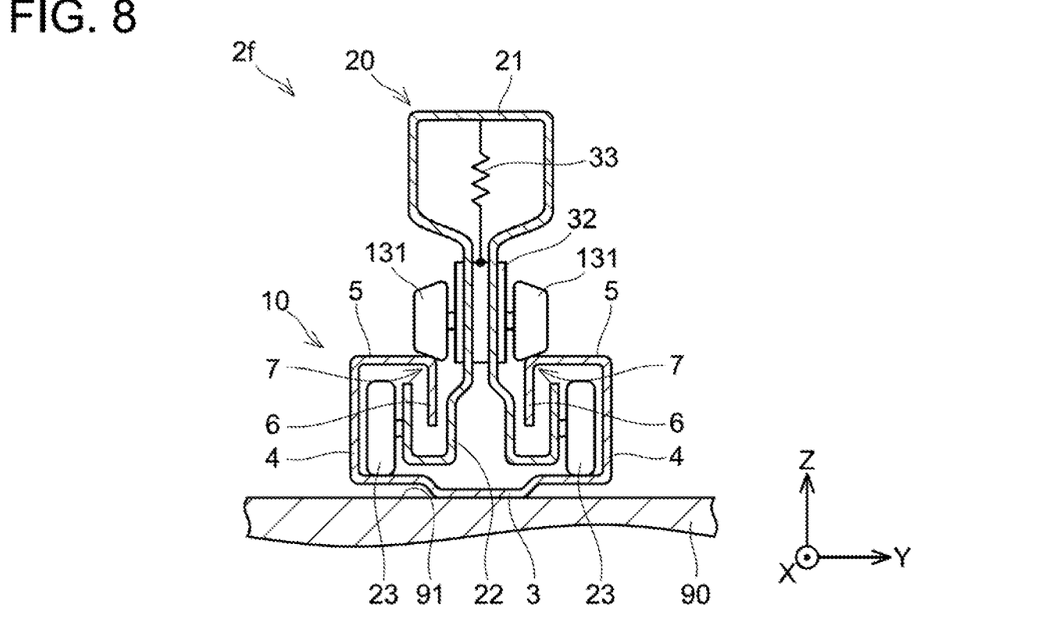
FIG. 8 is a cross-sectional view of a seat slider device of a seventh embodiment.

FIG. 8 shows a cross-sectional view of a seat slider device 2f of a seventh embodiment. Structural features of the lower rail 10 will be described again. The lower rail 10 includes the bottom plate 3, the pair of outer plates 4, the pair of upper plates 5, and the pair of inner plates 6. The pair of outer plates 4 extends upward respectively from both ends of the bottom plate 3 in the rail short direction. The pair of upper plates 5 extends respectively from the upper ends of the outer plates 4 toward the center of the lower rail 10 in the rail short direction. The pair of inner plates 6 extends downward respectively from center-side ends of the upper plates 5.

The upper rail 20 of the seat slider device 2f includes a pair of drive rollers 131. The pair of drive rollers 131 is also connected to the output shaft of the actuator 32. Each of the drive rollers 131 is in contact with its corresponding corner 7 between the upper plate 5 and the inner plate 6 of the lower rail 10. Each of the drive rollers 131 has a diameter that gradually increases from an outer side of the lower rail 10 in the short direction toward the center thereof. In other words, the drive rollers 131 each have a tapered shape of which diameter increases from the outer side in the rail short direction toward the center.

Further, a spring 33 is provided between an upper portion of the actuator 32 and the body upper portion 21 of the upper rail 20. The spring 33 presses the actuator 32 downward. The spring 33 presses the drive rollers 131 against the lower rail 10 via the actuator 32.

In the seat slider device 2f of the seventh embodiment, the drive rollers 131 which have the diameter that gradually increases toward the center of the lower rail 10 in the rail short direction are pressed against the corners 7 of the lower rail 10. By this pressing force, a load oriented toward a rail outer side is generated in the pair of corners 7, and the pair of corners 7 is thereby deformed outward in the rail short direction. Restoring force against this deformation acts on the pair of corners 7 toward the center in the rail short direction. This restoring force acts strongly on tapered surfaces of the tapered drive rollers 131. The restoring force acting on the drive rollers 131 makes the drive rollers 131 less likely slip. In the seat slider device 2f of the seventh embodiment, the drive rollers 131 are significantly less likely to slip on the lower rail 10.

Eighth Embodiment

Figure 9:
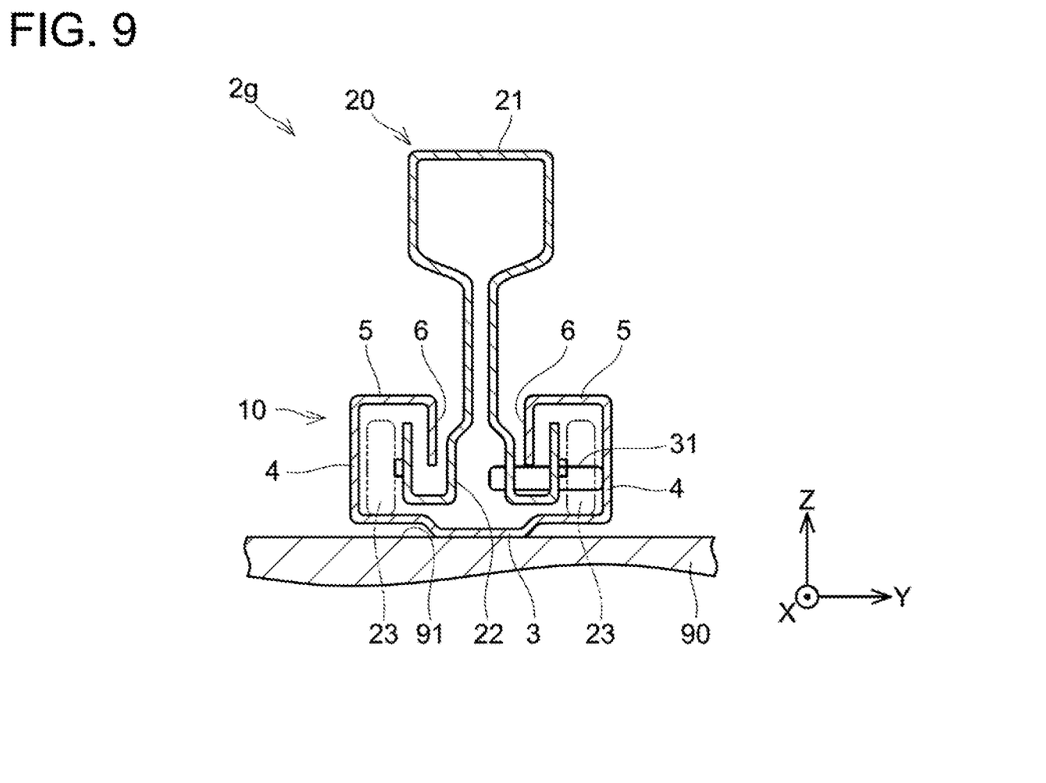
FIG. 9 is a cross-sectional view of a seat slider device of an eighth embodiment.

FIG. 9 shows a cross-sectional view of a seat slider device 2g of an eighth embodiment. In the seat slider device 2g, the drive roller 31 is pressed against one of the outer plates 4 from inside of the lower rail 10. In FIG. 9, depiction of an actuator configured to drive the drive roller 31 is omitted. In the seat slider device 2g of the eighth embodiment, an increase in a size of the device as a whole is suppressed since the drive roller 31 is located inside the lower rail 10.

Figure 10:
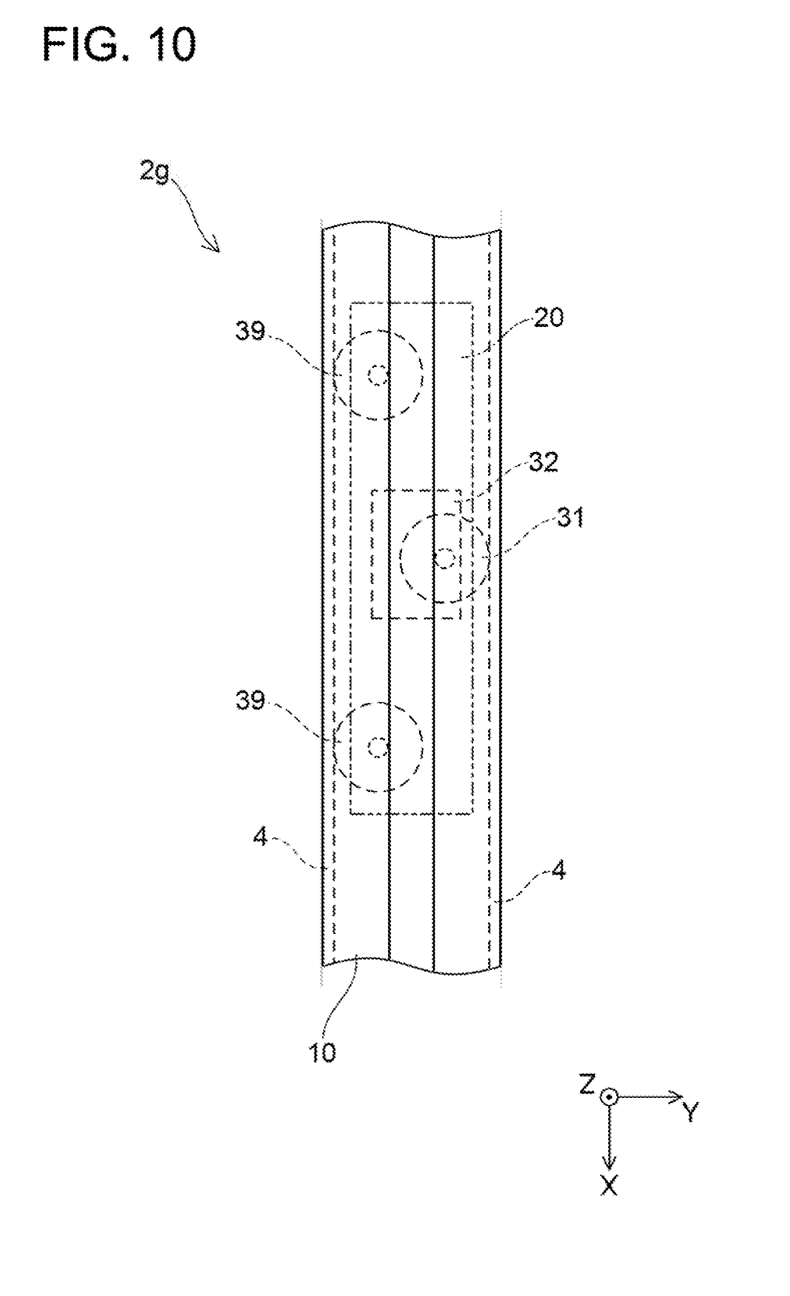
FIG. 10 is a schematic plan view of the seat slider device of the eighth embodiment.

FIG. 10 shows a schematic plan view of the seat slider device 2g. FIG. 10 is a view seeing the seat slider device 2g along the +Z direction in the coordinate system of the drawings. FIG. 10 depicts the upper rail 20 by a virtual line. The actuator 32, the drive roller 31, and second driven rollers 39 are depicted by broken lines, since they are hidden by the upper rail 20.

As shown in FIG. 10, the seat slider device 2g includes two second driven rollers 39 in addition to the drive roller 31. The drive roller 31 is pressed against one of the outer plates 4 of the lower rail 10 from the center side of the lower rail 10 in the rail short direction, and the two second driven rollers 39 are pressed against the other one of the outer plates 4 from the center side of the lower rail 10 in the rail short direction. The seat slider device 2g includes a plurality of rollers (namely, the drive roller 31 and the second driven rollers 39), and one of them (the drive roller 31) is pressed against one of the outer plates 4 from the center side of the lower rail 10 and the remaining rollers (the second driven rollers 39) are pressed against the other one of the outer plates 4 from the center side of the lower rail 10. That is, in the seat slider device 2g, the plurality of rollers is pressed against the lower rail 10, in a distributed manner, from the center of the lower rail 10 in the rail short direction toward both outer sides thereof. According to this configuration, the drive roller 31 is firmly pressed against the outer plate 4 of the lower rail 10, thus the drive roller 31 is less likely to slip on the lower rail 10.

The seat slider device 2g may include two or more drive rollers. That is, the seat slider device may include a plurality of rollers, and one or more of the rollers may be pressed against one side plate from inside of the lower rail, and one or more remaining rollers may be pressed against another side plate from inside of the lower rail. One or more of the plurality of rollers may be driven by an actuator.

Some features of the art described in the embodiments will be listed. The motor included in the actuator 32 is an electric motor. That is, the seat slider devices 2, 2a to 2g of the embodiments are able to move the upper rail (that is, the seat) by electric actuation. A switch for activating the actuator is provided at the seat. The switch for activating the actuator may be provided at a driver's seat as well.

Every one of the seat slider devices 2, 2a to 2g of the embodiments can move the upper rail 20 (that is, the seat) by electric actuation with a simple structure.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A seat slider device comprising:
a lower rail attachable to a body of a vehicle;
an upper rail attachable to a seat and slidably engaging with the lower rail;
a plurality of rollers provided in the upper rail and pressed against the lower rail or the body of the vehicle; and
an actuator configured to rotate at least one of the rollers, wherein:
the lower rail comprises:
a bottom plate; and
two side plates extending upward respectively from both ends of the bottom plate in a short direction of the lower rail, the short direction being perpendicular to a longitudinal direction of the lower rail,
one or more of the rollers are pressed against one of the side plates from inside of the lower rail, and
one or more remaining rollers are pressed against another of the side plates from inside of the lower rail.

2. The seat slider device of claim 1, wherein the actuator is configured to rotate directly at least one of the rollers.

3. The seat slider device of claim 1, wherein
the plurality of rollers includes one drive roller and two driven rollers,
the one drive roller is pressed against the one of the side plates and the two driven rollers are pressed against the other of the side plates,
the one drive roller is disposed between the two driven rollers in the longitudinal direction of the lower rail, and
the actuator is configured to rotate directly the one drive roller.

* * * * *